US012612951B1

(12) United States Patent
Singh

(10) Patent No.: US 12,612,951 B1
(45) Date of Patent: Apr. 28, 2026

(54) HELICAL TUBULAR COMPRESSION-SPRING

(71) Applicant: Shantanu Singh, Modinagar (IN)

(72) Inventor: Shantanu Singh, Modinagar (IN)

( * ) Notice: Subject to any disclaimer, the term of this patent is extended or adjusted under 35 U.S.C. 154(b) by 0 days.

(21) Appl. No.: 19/359,018

(22) Filed: Oct. 15, 2025

(30) Foreign Application Priority Data

Sep. 28, 2025 (IN) .............................. 202511093106

(51) Int. Cl.
*F16F 1/44* (2006.01)
*F16F 1/371* (2006.01)
*F16F 1/377* (2006.01)

(52) U.S. Cl.
CPC .............. *F16F 1/44* (2013.01); *F16F 1/3713* (2013.01); *F16F 1/377* (2013.01); *F16F 2230/36* (2013.01); *F16F 2232/08* (2013.01); *F16F 2234/02* (2013.01); *F16F 2236/04* (2013.01)

(58) Field of Classification Search
CPC ........ F16F 1/3713; F16F 1/3732; F16F 1/445; F16F 1/025; F16F 1/545; F16F 1/3835; F16F 1/426; F16F 3/06; F16F 2236/04; F16F 2236/045; F16F 2236/12
See application file for complete search history.

(56) References Cited

U.S. PATENT DOCUMENTS 170,590 A * 11/1875 Pratt ....................... F16F 1/371
16/DIG. 36
1,169,863 A * 2/1916 Peycke ..................... F16F 7/04
213/29

1,761,272 A * 6/1930 O'Connor ................. B61F 5/12
267/206
1,928,678 A * 10/1933 Sjolander .................. F01L 1/16
123/188.13
1,938,099 A * 12/1933 Endsley ..................... F16F 3/06
267/206
2,095,545 A * 10/1937 Endsley ..................... F16F 3/06
29/896.9
2,136,908 A * 11/1938 Pierce ....................... F16F 3/06
267/204

(Continued)

FOREIGN PATENT DOCUMENTS

GB 561037 A * 5/1944 ........... H01R 13/187

*Primary Examiner* — Bradley T King
(74) *Attorney, Agent, or Firm* — Novel Patent Services LLC

(57) ABSTRACT

The present invention discloses a helical tubular compression-spring assembly comprising a tubular guide-rod having a non-circular cross-section helically swept along its longitudinal-axis, and a slider with a complementary tubular bore swept helically along another path. During operation, insertion of the guide-rod into the slider from an aligned coaxial position induces elastic-deformation in the guide-rod walls arising from a geometric-mismatch between the helices, thereby storing elastic-energy. Upon release, this stored energy urges the slider toward the aligned-position, producing a restoring-force whose magnitude can be precisely tuned through variations in helical-pitches, cross-sectional eccentricities, wall-thickness, material properties, and overall dimensions. This integrated design further offers superior compactness, customizable force-displacement characteristics, enhanced durability, and simplified manufacturing compared to conventional compression-springs.

3 Claims, 6 Drawing Sheets

(56) References Cited

U.S. PATENT DOCUMENTS

| | | | | |
|---|---|---|---|---|
| 2,175,385 | A * | 10/1939 | Endsley | F16F 3/04 |
| | | | | 29/896.9 |
| 2,815,201 | A * | 12/1957 | Girod-Eymery | F16F 3/12 |
| | | | | 267/203 |
| 3,308,908 | A * | 3/1967 | Bunn | B64C 25/62 |
| | | | | 188/374 |
| 3,624,764 | A * | 11/1971 | Goben | F16F 7/121 |
| | | | | 188/377 |
| 3,844,545 | A * | 10/1974 | Pershin | F16F 3/06 |
| | | | | 267/152 |
| 4,591,030 | A * | 5/1986 | Antkowiak | F16F 9/303 |
| | | | | 267/153 |
| 4,732,372 | A * | 3/1988 | Dickhart, III | B60G 11/16 |
| | | | | 267/287 |
| 10,473,176 | B2 * | 11/2019 | Deman | F16F 1/445 |
| 2004/0100008 | A1 * | 5/2004 | Landry, Jr. | F16F 1/3713 |
| | | | | 267/153 |
| 2005/0263946 | A1 * | 12/2005 | Zawilinski | F16F 3/06 |
| | | | | 267/140.12 |
| 2008/0169827 | A1 * | 7/2008 | Dorwarth | H03K 17/962 |
| | | | | 324/661 |
| 2012/0225408 | A1 * | 9/2012 | Moore | B32B 25/20 |
| | | | | 81/438 |

* cited by examiner

L'

B

S

L*

G

S

HELICAL TUBULAR
COMPRESSION-SPRING

FIELD OF THE INVENTION

The present invention relates to the field of mechanical spring systems, and more particularly to a compression-spring assembly comprising a helical tubular guide-rod and a cooperating slider having a complementary bore, wherein a restoring-force is generated through controlled elastic-deformation of the guide-rod induced by geometric-mismatch during its interaction with the slider bore along their helical profiles.

BACKGROUND

Conventional compression-springs are commonly constructed from coiled wires or helical cylinders that produce a restoring-force varying approximately linearly with axial compression. These designs, while simple and widely used, have limited tunability, are bulky, and are often difficult to manufacture in specialized configurations—such as those required for non-linear or customized force-displacement characteristics—due to their dependence on material stiffness, wire diameter, and coil geometry. They also frequently suffer from fatigue due to excessive strain experienced by the coiled wires during repeated loading cycles.

Prior art references such as U.S. Pat. Nos. 6,193,225B1 and 8,590,867B2 disclose non-circular or polygonal spring cross-sections but do not combine a tubular guide-rod with a corresponding slider bore, nor employ geometric-mismatch between helical-paths to generate force. Tubular spring designs like U.S. Pat. Nos. 11,060,580B2 and 10,962,073B2 describe tubular compression elements and load tuning but lack the mechanism of differing helical-path pitches for force control. References like U.S. Pat. No. 6,664,702B2 control elastic-deformation via localized features rather than geometric-mismatch, and patents like U.S. Pat. No. 6,460,840B2 pertain to conventional variable-pitch helical springs not involving restoring-force generation through guide-rod and slider bore geometry.

In conclusion, no prior art discloses or anticipates a compression-spring assembly integrating a helical tubular guide-rod and a complementary slider bore, both having identical non-circular cross-sections swept along distinct helical-paths, enabling independently tunable spring force and guiding action through geometric-mismatch and elastic-deformation in a compact, multifunctional assembly.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present invention provides a helical tubular compression-spring assembly that comprises a tubular guide-rod, and a slider.

The tubular guide-rod comprises a non-circular cross-section perpendicular to its longitudinal-axis, formed by sweeping the cross-section along a first helical-path.

The slider defines a tubular bore having a non-circular cross-section complementary to that of the guide-rod perpendicular to its longitudinal-axis. The tubular bore is formed by sweeping the complementary cross-section along a second helical-path.

The magnitude of the restoring-force generated by the assembly is governed by the degree of geometric-mismatch between the tubular guide-rod and the tubular bore. The geometric-mismatch being determined by one or more of the following factors: (i) the difference in pitch-lengths between the first and second helical-paths, which controls the degree of elastic-strain induced in the guide-rod; (ii) the eccentricities of the non-circular cross-sections, defined as their deviation from a circular profile, which influences the distribution and magnitude of elastic-strain induced in the guide-rod; (iii) the elastic properties of the guide-rod material, including Young's modulus and yield strength, which dictate the relationship between applied elastic-stress and resulting elastic-strain in its tubular wall; (iv) the wall-thickness of the guide-rod, which directly affects its structural rigidity and the extent of elastic-strain under axial compression; and (v) the overall dimensions of the compression-spring assembly, including length and cross-sectional size, which collectively determine its force-displacement characteristics and maximum load capacity.

This design allows tunable force-displacement characteristics, compactness, and robust performance under repeated compression cycles.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The invention is illustrated with reference to the accompanying drawings, wherein like reference characters indicate corresponding components and geometric-entities throughout.

DETAILED DESCRIPTION

Figure 1:
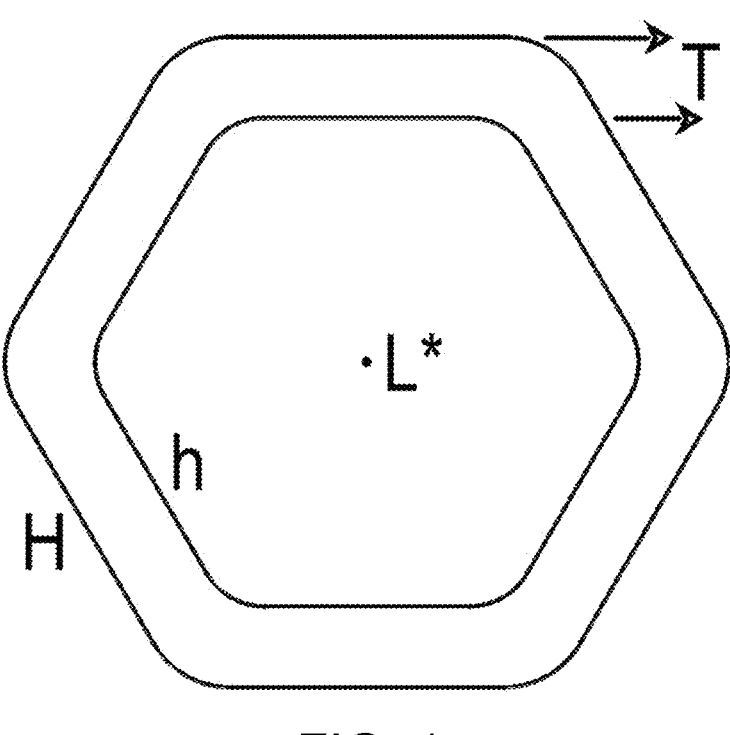
FIG. 1 illustrates a top-orthographic view of the non-circular cross-sections of the guide-rod (G) and the bore (B), both oriented perpendicular to their coincident longitudinal-axis (L*). The cross-section (C) of the guide-rod (G) is defined by the planar annular region bounded between the outer hexagon (H) and the inner hexagon (h), while the cross-section (C') of the bore (B) corresponds to the planar region enclosed by the outer hexagon (H). It is noted that both the cross-sections (C) and (C') have identical outer boundary shapes, represented by the outer hexagon (H). The wall-thickness (T) of the guide-rod (G) is also indicated.
Figure 2:
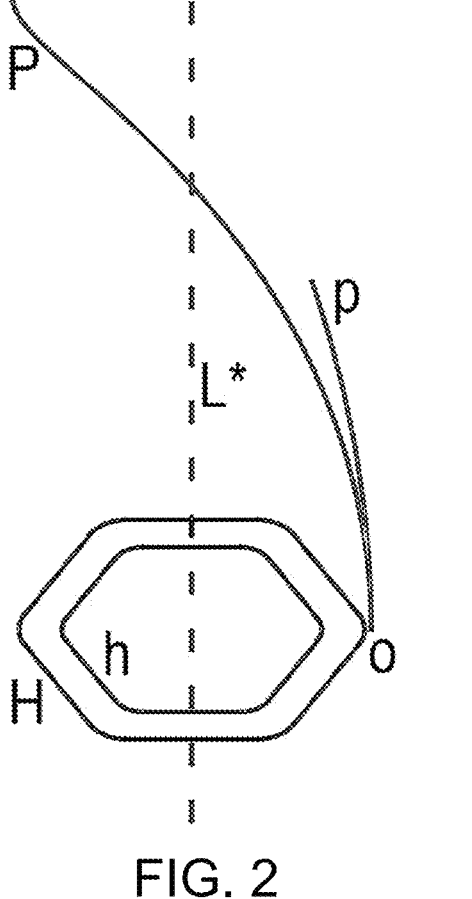
FIG. 2 illustrates an isometric view showing the formation of the guide-rod (G) and the bore (B), wherein their respective hexagonal cross-sections (C) and (C') are swept along respective helical-paths (P) and (p) about the longitudinal-axis (L*). The difference in pitches between the two helical-paths (P) and (p) is also depicted, becoming evident as they diverge from their common origin (o) along the longitudinal-axis (L*).
Figure 3A:
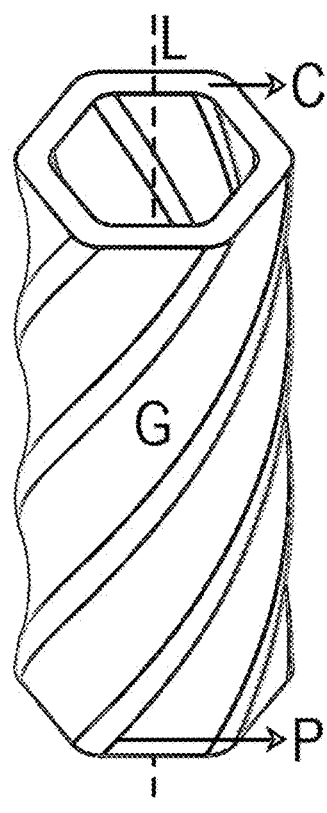
FIG. 3A illustrates an isometric view of the helical tubular guide-rod (G), having the hexagonal cross-section (C) perpendicular to its longitudinal-axis (L), formed by sweeping the cross-section (C) along the helical-path (P) about the longitudinal-axis (L).
Figure 3B:
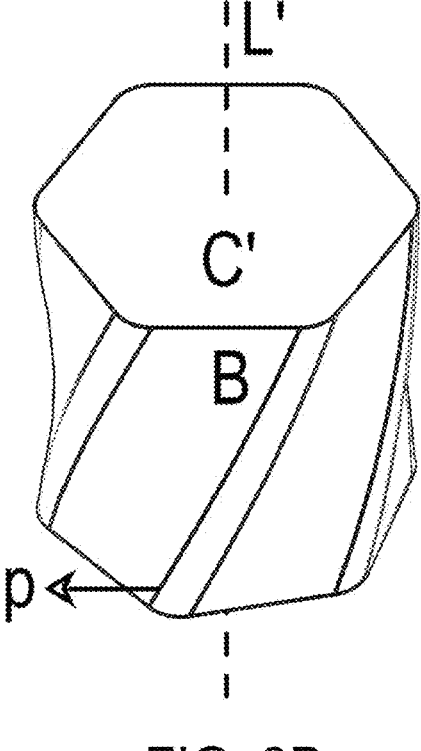
FIG. 3B illustrates an isometric view of a helical tubular structure defining the bore (B) complementary to the guide-rod (G), having the complementary hexagonal cross-section (C') perpendicular to its longitudinal-axis (L'), formed by sweeping the complementary cross-section (C') along the helical-path (p) about the longitudinal-axis (L').
Figures 3C, 4A:
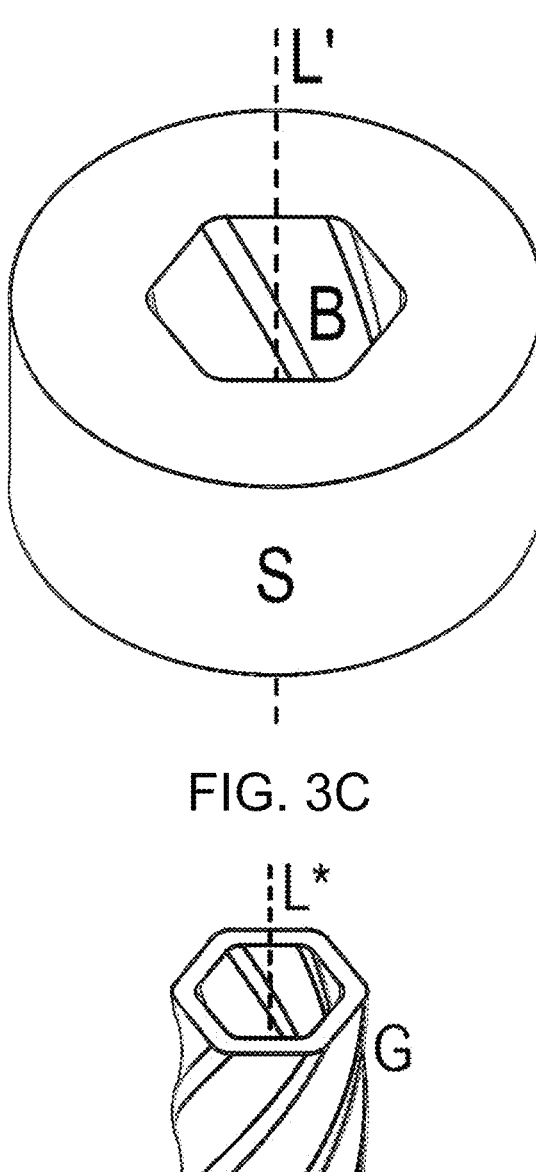
FIG. 3C illustrates an isometric view of the slider(S), showing the complementary bore (B) configured to receive the guide-rod (G) coaxially along the longitudinal-axis (L').
FIGS. 4A, 4B, and 4C respectively illustrate isometric, side-orthographic, and side-orthographic cross-sectional views of the guide-rod (G) in its original undeformed state relative to the slider(S). In this configuration, the guide-rod (G) is positioned above and coaxially aligned with the bore (B) but has not yet been inserted. Their coincident longitudinal-axes (L) and (L') are represented collectively as the longitudinal-axis (L*), defining an aligned-position from which insertion may commence.
Figures 4B, 4C:
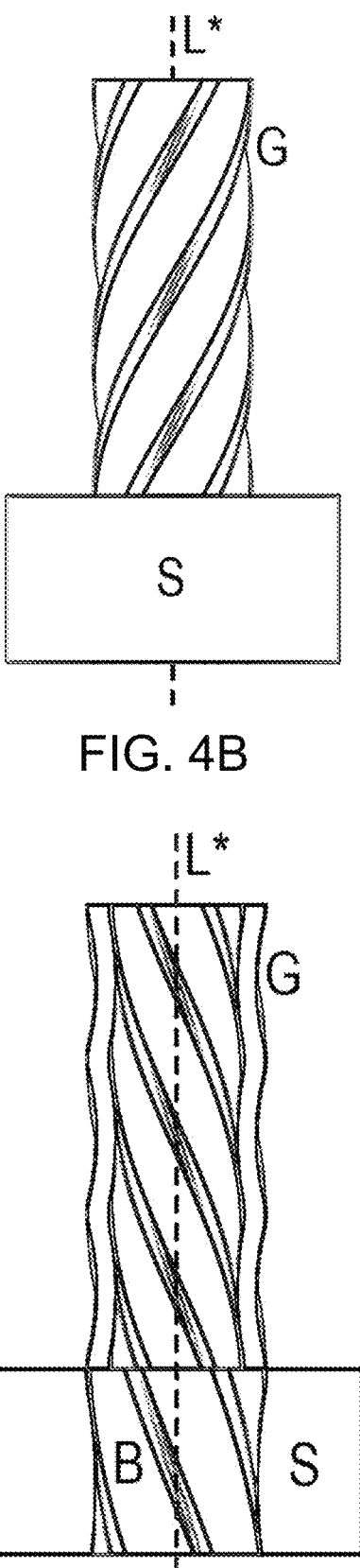
Figure 5A:
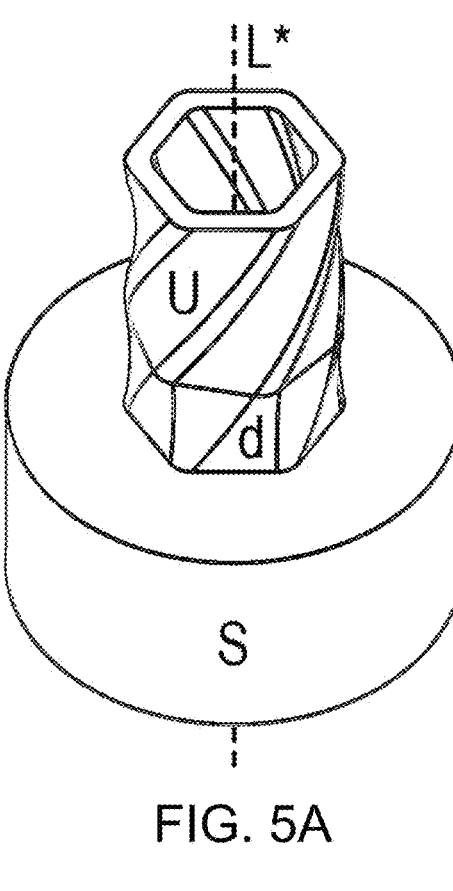
FIGS. 5A, 5B, and 5C respectively illustrate isometric, side-orthographic, and side-orthographic cross-sectional views of the compression-spring assembly in a compressed state, wherein the guide-rod (G) is shown inserted into the bore (B) of the slider(S) along the longitudinal-axis (L*). Labels (U), (d), and (D) indicate undistorted, partially distorted, and fully distorted regions of the guide-rod (G), respectively.
Figure 5B:
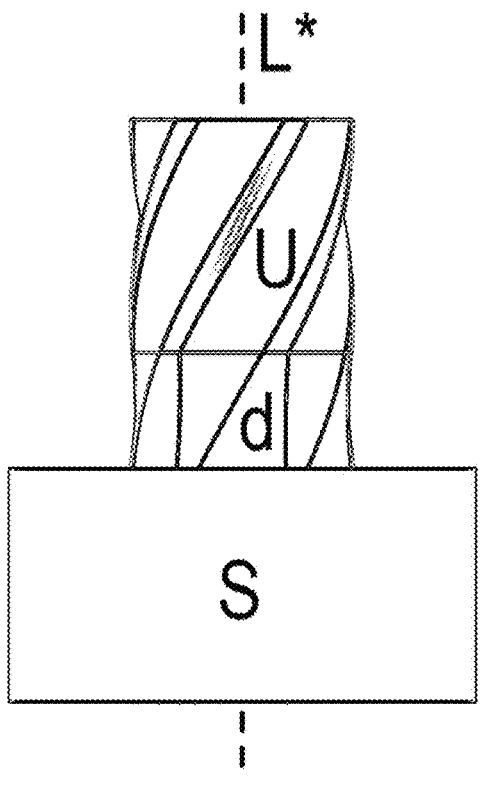
Figure 5C:
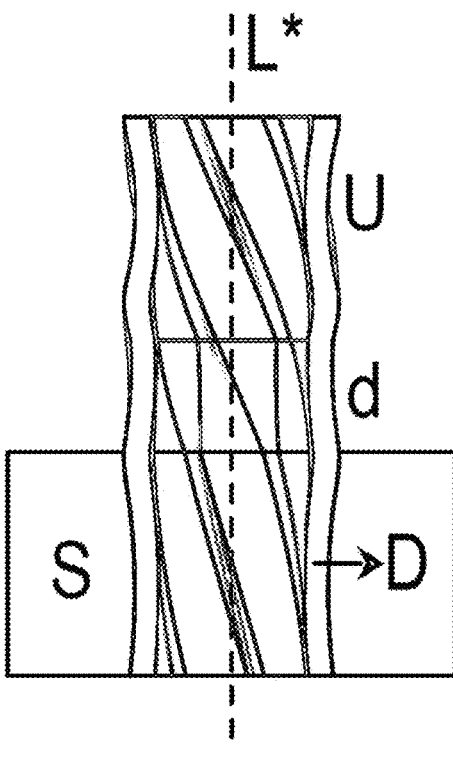
Figure 5D:
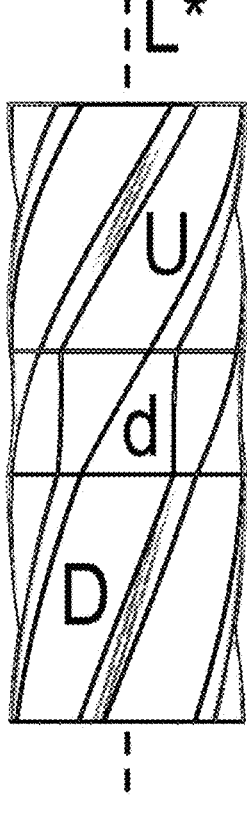
FIG. 5D illustrates a side-orthographic view of the compressed guide-rod (G), depicting the undistorted, partially distorted, and fully distorted regions, designated respectively as (U), (d), and (D), distributed along the longitudinal-axis (L*).

Reference will now be made in detail to the present preferred embodiments of the invention, examples of which are illustrated in the accompanying drawings. Wherever possible, the same reference numerals are used in the drawings and the description to refer to the same or like parts.

The helical tubular compression-spring assembly comprises the following principal components and their functional relationships. A tubular member having a first non-circular cross-section helically swept about a first longitudinal-axis to define a first helical-path. The guide-rod is engineered to undergo controlled elastic-deformation without permanent plastic yielding, ensuring reliable performance and dimensional stability over repeated loading cycles.

A tubular receptacle defining a bore with a second non-circular cross-section complementary to that of the guide-rod, formed by sweeping the second cross-section along a second helical-path about a second longitudinal-axis. The first and second cross-sections have identical outer boundary shapes, ensuring precise geometric complementarity and controlled engagement between the guide-rod and the bore. The slider is configured to receive the guide-rod from an aligned (mutually coaxial) position and to impose geometric constraints arising from differences in their helical pitch-lengths and cross-sectional geometries. Owing to its rigidity, the slider remains undeformed during relative motion with the guide-rod, while elastic-deformation is predominantly induced within the guide-rod walls.

During insertion of the guide-rod into the slider along their coincident longitudinal-axis from the aligned-position, controlled elastic-deformation is induced within the guide-rod wall due to the geometric-mismatch between the guide-rod and the slider bore. This deformation results in the storage of elastic-strain energy within the structure, which, upon release, is converted into a restoring-force that drives the assembly back toward the aligned-position. The operating mechanism of the assembly is governed by the principle of conservation of energy, wherein the conversion of stored elastic-strain energy into mechanical work, and vice versa, defines the force-displacement characteristics, thereby enabling predictable, tunable, and potentially non-linear characteristics that can be precisely tailored to specific application requirements.

In the present embodiment, the non-circular cross-sectional profile of the guide-rod and the slider is exemplified by a hexagonal geometry with rounded vertices. However, the invention is not limited to this particular shape. Alternative non-circular profiles—such as elliptical, polygonal, or other equivalent geometries—may likewise be employed, provided they preserve the underlying force-generation principle of the disclosed mechanism, namely, the induction of elastic-deformation within the guide-rod walls arising from geometric-mismatch relative to the complementary bore of the slider.

The compression force-displacement characteristics of the helical tubular compression-spring can be precisely controlled by adjusting one or more of the following design parameters. Variation in the relative helical pitch-lengths modulates the extent of elastic-deformation experienced by the guide-rod during its insertion into and compression within the slider bore, thereby directly influencing both the magnitude and evolution of the restoring-force throughout the slider's travel.

Eccentricity, defined as the degree of deviation of the cross-section from a circular profile, affects how the tubular guide-rod walls deform under axial-compression. Greater eccentricity increases required elastic-deformation for a given displacement, and vice-versa, thereby tuning the restoring-force and enabling non-linear or progressive force-displacement characteristics.

Materials possessing higher elastic-modulus or yield-strength (e.g., spring steels such as AISI 1075 or 1095, stainless steels such as 17-7 PH or 301, and titanium alloys such as Ti-6Al-4V) generate greater restoring-forces for a given elastic-deformation, thereby producing steeper force-displacement characteristics. Conversely, more compliant materials (e.g., beryllium copper, phosphor bronze, or high-performance polymers such as PEEK or Ultem) accommodate larger elastic-deformations under the same restoring-force, thereby enabling more gradual force-displacement characteristics and improved durability.

Increased wall-thickness enhances resistance to elastic-deformation, thereby generating a higher restoring-force per unit displacement. Conversely, thinner walls permit greater elastic compliance, enabling finer control over the spring's stiffness, elastic-deformation behavior, elastic-energy storage capacity, and force-displacement characteristics.

The length, diameter, and cross-sectional dimensions of the guide-rod and the slider collectively determine the total available deformation, maximum load, and compactness of the compression-spring assembly, allowing adaptation to application-specific spatial and mechanical requirements.

The helical tubular compression-spring of the present invention provides several significant advantages over conventional compression-spring designs. By integrating the functions of the guide-rod and the compression-spring into a single tubular structure, the assembly delivers high force output in a compact, lightweight form while optimizing load-bearing efficiency. This integration reduces component count and overall volume, making the spring suitable for space and weight constrained applications in mechanical assemblies, robotics, automotive systems, and precision instruments. It simultaneously provides guiding functionality and spring force, yielding a synergistic performance that exceeds the capabilities of the sum of its individual components.

The tubular guide-rod structure exhibits improved axial stability and reduced buckling risk under compressive loads. Furthermore, since amplitude of elastic-deformation in the tubular walls is inherently lower than that experienced in conventional coil bending, resultant fatigue accumulation is substantially reduced, thereby extending the operational lifespan and also ensuring consistent performance over prolonged use.

The hollow interior of the guide-rod allows for the incorporation of functional elements such as fluid channels, damping mechanisms, or cooling pathways, enabling additional capabilities to be seamlessly integrated into the spring assembly without increasing its overall footprint.

The spring can be fabricated using standard machining, extrusion, or additive manufacturing techniques, eliminating the need for complex coiling operations. Its modular guide-rod and slider configuration facilitates straightforward assembly and maintenance, while accommodating variations in material properties, cross-sectional profiles, and helical-pitch distributions to satisfy a wide range of mechanical performance requirements.

In advanced implementations, the helical tubular compression-spring may be modified to achieve customized compression force-displacement characteristics and enhanced mechanical performance as follows. In advanced implementations, the inner wall of the guide-rod may be configured with a geometry different from that of the outer wall. By tailoring the radial dimensions of the guide-rod—including the shape, thickness distribution, or cross-sectional shape of the inner wall independently from that of the outer—and by varying these parameters along its longitudinal-axis, complex and non-linear compression force-displacement characteristics can be achieved, enabling precise control over stiffness gradients and elastic-energy storage characteristics.

The helical pitch-lengths, cross-sectional shapes and dimensions of the guide-rod and the slider bore may be varied along their respective longitudinal-axes to precisely customize the force-displacement characteristics. For instance, gradual pitch-length changes or transitions in cross-sectional geometry (e.g., from hexagonal to elliptical) can generate customized non-linear force-displacement characteristics, while multiple integrated sections with distinct geometric profiles can produce stepped or progressive force-displacement characteristics tailored to specific application requirements.

The guide-rod and slider may be constructed from different materials or incorporate material gradients along their lengths and breadths, enabling tailored elastic behavior and customized force-displacement characteristics.

Guide-rods and corresponding slider bores may be formed with slanted or non-linear geometries by sweeping respective cross-sections along oblique helical-paths, wherein the principal-axes of the helices may follow arbitrary straight or curved trajectories, thereby enabling non-axial and non-linear guidances, and tailored directional motions.

In certain implementations, the internal pressure within the tubular cavity of the guide-rod may be actively varied in real time to dynamically modulate its stiffness, thereby enabling precise, active control over the force-displacement characteristics of the assembly.

In certain advanced implementations, the slider may be configured to undergo elastic-deformation during operation, while the guide-rod may function as either a rigid or elastic structural element, thereby localizing restoring-force generation within the slider or both components. It will be understood that other advanced variations described above are equally applicable to this variation.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A compression-spring assembly comprising:
a tubular guide-rod formed by sweeping a first non-circular cross-section perpendicular to a first longitudinal-axis along a first helical-path about the first longitudinal-axis, wherein the first helical-path has a first pitch-length;
a slider defining a tubular bore to receive the guide-rod, wherein the tubular bore is formed by sweeping a second non-circular cross-section perpendicular to a second longitudinal-axis along a second helical-path about the second longitudinal-axis, wherein the second helical-path has a second pitch-length;
wherein the first and second non-circular cross-sections comprise outer boundaries of an identical shape, and the first and second pitch-lengths are different;
wherein the tubular guide-rod and the tubular bore comprise an aligned-position in which the first and second longitudinal-axes coincide; and
wherein inserting the tubular guide-rod into the tubular bore of the slider from the aligned-position along the coincident first and second longitudinal-axes induces elastic-deformation of the tubular guide-rod due to a geometric-mismatch between the tubular guide-rod and the tubular bore arising from the difference in the first and second pitch-lengths, thereby generating a restoring-force that, upon release, returns the tubular guide-rod and the slider toward the aligned-position.

2. The compression-spring assembly of claim 1, wherein magnitude of the restoring-force is determined by magnitude of the geometric-mismatch, wherein the magnitude of the geometric-mismatch depending on one or more of:
a difference in the first and second pitch-lengths;
eccentricities of the first and second non-circular cross-sections;
elastic-properties of a material forming the tubular guide-rod, wherein the material is capable of reversible-deformation;

a wall-thickness of the tubular guide-rod; and
overall dimensions of the compression-spring assembly.

3. A method of generating a restoring-force using the compression-spring assembly of claim 1, the method comprising:

positioning the slider such that the tubular bore of the slider receives the tubular guide-rod in the aligned-position;

inserting the tubular guide-rod into the tubular bore of the slider along the first and second longitudinal-axes to produce a displacement, thereby elastically deforming the tubular guide-rod and generating the restoring-force; and releasing the displacement, whereby the restoring-force returns the tubular guide-rod and the slider toward the aligned-position.

\* \* \* \* \*